April 5, 1960

H. GANG

2,931,568

FACTOR ENTERING MEANS

Filed July 18, 1955

INVENTOR.
HERMAN GANG
BY
ATTORNEY.

April 5, 1960

H. GANG 2,931,568

FACTOR ENTERING MEANS

Filed July 18, 1955

INVENTOR.
HERMAN GANG
BY
ATTORNEY.

April 5, 1960  H. GANG  2,931,568
FACTOR ENTERING MEANS

Filed July 18, 1955  10 Sheets-Sheet 10

INVENTOR
*HERMAN GANG*
BY
*George V. Hall*
ATTORNEY

United States Patent Office 2,931,568
Patented Apr. 5, 1960

2,931,568

FACTOR ENTERING MEANS

Herman Gang, Morris Plains, N.J., assignor to Monroe Calculating Machine Company, Orange, N.J., a corporation of Delaware Application July 18, 1955, Serial No. 522,800

15 Claims. (Cl. 235—62)

This invention relates to an improved factor entering means for calculating machines and more particularly to such means operable in conjunction with devices which preclude certain inadvertent or premature manipulation by the operator and consequent incorrect entry of the factors.

In the performance of certain calculations on particular types of calculating machines, it is desirable or necessary to position the shiftable register carriage in a given position prior to institution of the calculation, Furthermore, in certain of such machines it is necessary that the carriage be so positioned before the factors involving the calculations may be entered into the machine. For example, in the machine of applicant's Patent No. 2,531,206 and as fully disclosed therein, a multiplier set on the keyboard may be transferred to a series of storage devices only when the register carriage is in its left end position in which position a program of multiplication may then be instituted in accordance with the operation fully described in applicant's Patent No. 2,531,207. Also in accordance with the above Patent No. 2,531,206, a dividend set on the keyboard may be entered into the accumulator register of the shiftable carriage only when said carriage is in its right end position or in an intermediate position corresponding to a set tabulation key.

As fully disclosed in the above Patent No. 2,531,206, a dual purpose mechanism is selectively operable to perform the multiplier or dividend entering operation. This mechanism automatically controls a two-cycle operation of the registering mechanism, the first cycle of which is additive and the second subtractive.

In the performance of a multiplier entering operation, the carriage is automatically shifted to its left end position if displaced therefrom and then the multiplier entering operation is instituted. If, however, the carriage is in the left end position, the multiplier entering operation is instituted forthwith. The additive cycle of operation registers the value set on the keyboard in the accumulator register. The multiplier storage devices are then engaged with the accumulator wheels in which the value has been registered and the subtractive cycle initiated. The subtractive cycle of operation will subtract the value set on the keyboard from the accumulator register thereby transferring said value from the accumulator to the multiplier storage devices. At the conclusion of this subtractive cycle of registration the keyboard is cleared.

It will be observed that a count of one will be registered in the counter register as a result of the single additive cycle of operation. However, this count of one will be removed by the subsequent subtractive cycle. Both the accumulator register and the counter register will therefore be conditioned for the following program of multiplication.

In the performance of a dividend entering operation, the carriage is first shifted to the right end position or to a position corresponding to a set tabulation key if displaced therefrom. The additive cycle of operation will register the dividend value set on the keyboard in the accumulator register, and at the conclusion of this additive registering cycle the keyboard will be cleared. Therefore, the following subtractive cycle of registration, unlike the subtractive cycle of the multiplier entering operation, will be ineffective to remove the value from the accumulator register. However, the subtractive cycle operates to remove the unwanted count of one from the counter register thereby leaving this register in condition for registration of the quotient.

The factor entering devices, as briefly outlined in the foregoing, have proved satisfactory but for inadvertent manipulation by the operator. For example, during a shift of the register carriage to the position in which the first factor of a calculation is to be entered or during entry of said factor, the operator may prematurely depress keys of the keyboard to enter the second factor of the calculation causing incorrect entry of the first factor. Obviously, provision to lock the keyboard to prevent depression of the keys until the end of the first factor entering operation would prevent the above misoperation. However, in consideration of the dividend entering operation, it will be seen that it is not possible to lock up the keyboard because the keyboard must be cleared before completion of the operation, i.e., at the end of the additive cycle. The keyboard could, however, be locked during the multiplier entering operation; but such provision in one and not in the other instance would be impractical.

In consideration of the foregoing this invention provides an improved multiplier-dividend entering mechanism, which permits the keyboard to be locked during each complete multiplier or dividend entering operation including a shift of the register carriage. To permit the keyboard locking operation, the factor entering devices of the aforenoted Patent No. 2,531,206 have been modified in operation so that only a single cycle of operation of the registering mechanism is utilized for the dividend entering operation. During this single cycle of operation, the drive means for the counter register is disabled so that said counter register remains conditioned to receive the quotient registration of the subsequent division operation. It will be evident that this modified arrangement will permit the keyboard to be locked for both the multiplier and the dividend entering operations for the reason that the keyboard will not be cleared until the conclusion of either operation. The invention furthermore provides for automatic control of the keyboard locking means during a program of multiplication or of division.

Other objects and advantages of the invention will be evident from the following description with reference to the accompanying drawings in which:

Fig. 1a is a detailed elevation of the main differential clutch transmission as viewed from the left side of the machine.

Fig. 7 is a fragmentary elevation taken as viewed from the direction of the arrows on line 7—7 of Figure 3 showing details of the registration drive train.

Fig. 8 is a fragmentary perspective showing the setting lever operated by the factor entering mechanism for controlling operation of the main clutch transmission of Figure 1a.

*The machine drive*

The machine drive comprises a main differentially operable clutch transmission 104 (Fig. 1a) which is adapted to drive the registering mechanism or alternatively the carriage shifting mechanism.

The differential clutch transmission 104 (Figs. 1a, 8) is driven by a motor (not shown) and is constructed substantially in accordance with the disclosure of Patent #1,566,650. Normally the gearing comprising both working legs of the differential drive rotate idly and no drive will be transmitted to output gear 408. The working legs of the differential drive are selectively arrested by means of a reversing clutch lever 111 fulcrumed on the machine frame and adapted for neutral, additive or subtractive setting. Clockwise movement of lever 111 (Fig. 1a counterclockwise Fig. 8) positions it to additive setting whereby a hook arm 114 of said lever will engage a lug on a gear 105 which forms one leg of the differential drive to interrupt its movement thereby causing rotation of output gear 408. Conversely, counterclockwise movement (Fig. 1a) will position the lever to subtractive setting whereby a hook arm 113 thereof will engage a stop 110 of the other leg of the differential drive to interrupt its movement and cause rotation of output gear 408 in the reverse direction.

*Registering mechanism*

The registering mechanism and the drive control means therefor is of the type disclosed in applicant's Patent #2,531,207 and operates substantially in accordance with the disclosure of said patent.

The wheels 1 (Figs. 1, 3, 12) of the accumulator register are mounted in a shiftable carriage 2 and are driven by differentially settable digital actuators 3 and tens-transfer actuators 4 through intermediate gears 5 and 6. Digital actuators 3 and tens-transfer actuators 4 are mounted on shafts 7 and 8 respectively and are driven either forwardly or reversely at a one to one ratio by a gear train which is exterior of the machine right side frame. The gear train is driven by the differential clutch transmission 104 through a normally engaged friction clutch 352 (Fig. 7) which transmits power to a shaft 350 on which gear 407 (Figs. 3, 7) of the train is mounted. The gear train includes an idler gear 406 loosely mounted on a shaft 415 and driven by gear 407, a double gear 405 fixed on tens-transfer actuator shaft 8 and driven by idler gear 406, an idler gear 404 driven by gear 405, and a gear 403 driven by gear 404 and fixed on digital actuator shaft 7.

Carriage 2 is denominationally shiftable to the right or left by the clutch transmission 104 through a normally disengaged friction clutch (not shown) which is engaged to complete the drive upon disengagement of the normally engaged friction clutch 352 (Fig. 7) of the registration drive. As hereinbefore noted, a carriage shift operation is automatically effected prior to operation of the factor entering devices if the carriage is displaced from the position in which the factor is to be entered. The devices of the invention, however, are not concerned with operation of the carriage shifting mechanism except in that a keyboard lock is set upon initiation of a factor entering operation inclusive of a carriage shift operation if effected in conjunction therewith as will appear hereinafter.

Figure 1:
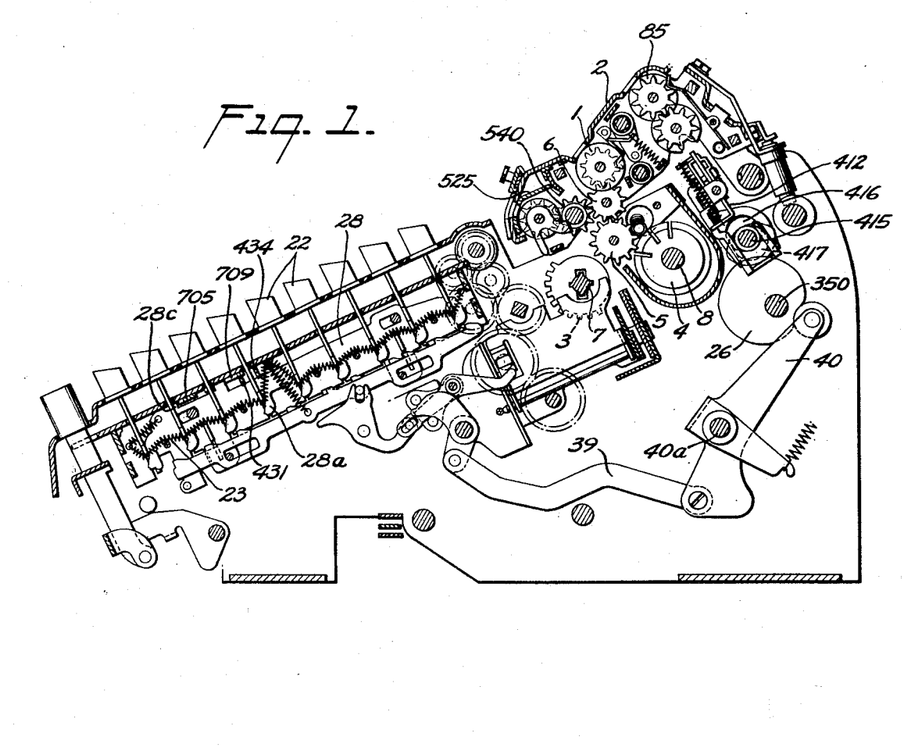
Fig. 1 is a vertical section through the registering and selection mechanism of a calculating machine embodying the invention.

Registration is effected in the wheels 85 (Figs. 1, 3, 12) of the counter register by counting fingers 412 one of which is shown in Figure 1. These fingers are operated substantially in accordance with the disclosure of the aforenoted Patent #2,531,207.

By adjustment of a change lever 60, registration in the counter register may be effected either like or unlike in arithmetical sign the registration in the accumulator register. The change lever is connected to a bell crank 413 (Figs. 3, 7) by a link 414, and the bell crank, through pin engagement with a circumferential slot in a collar fixed on shaft 415 on which idler gear 406 is loosely mounted, is adapted to move said shaft transversely of the machine. Fixed on shaft 415 are a pair of cams 416 and 417 (Fig. 1), and upon transverse movement of said shaft one or the other of said cams is moved into driving relationship with fingers 412.

Figure 9:
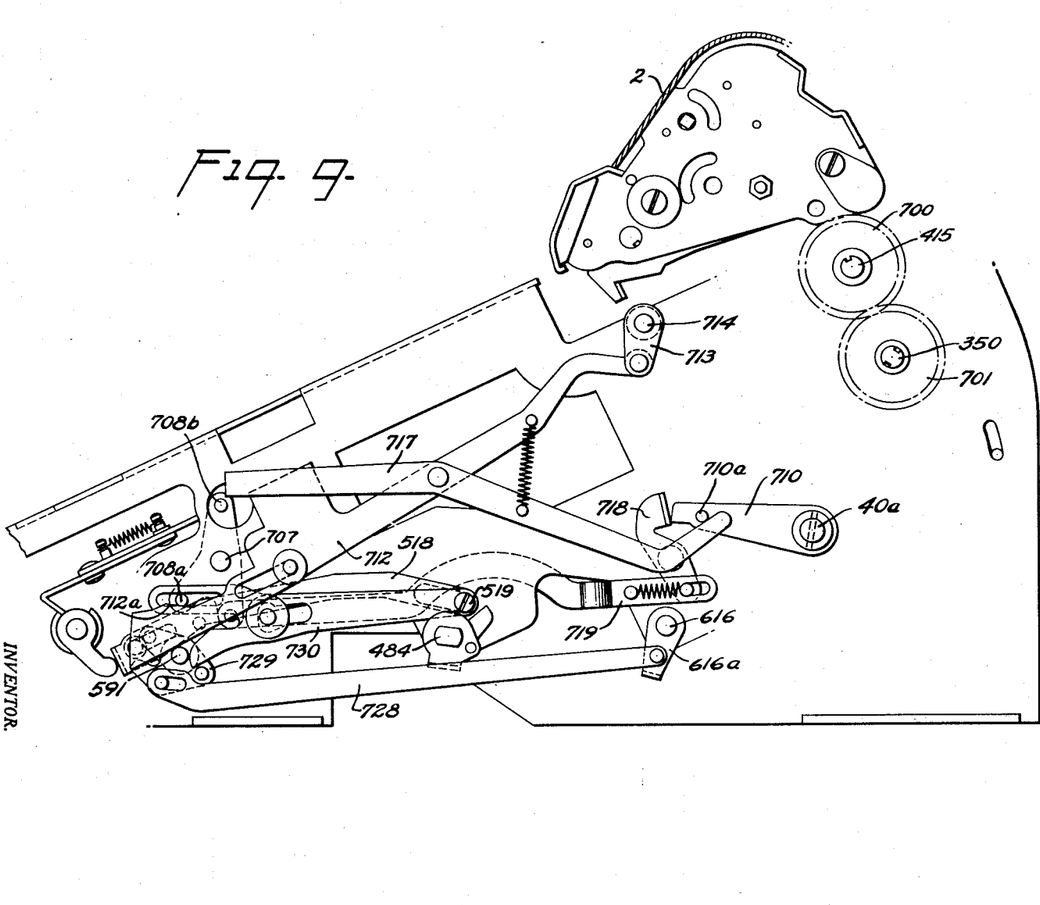
Fig. 9 is a right side elevation of the machine showing the controls for the keyboard locking means in normal released position.
Figures 10, 12:
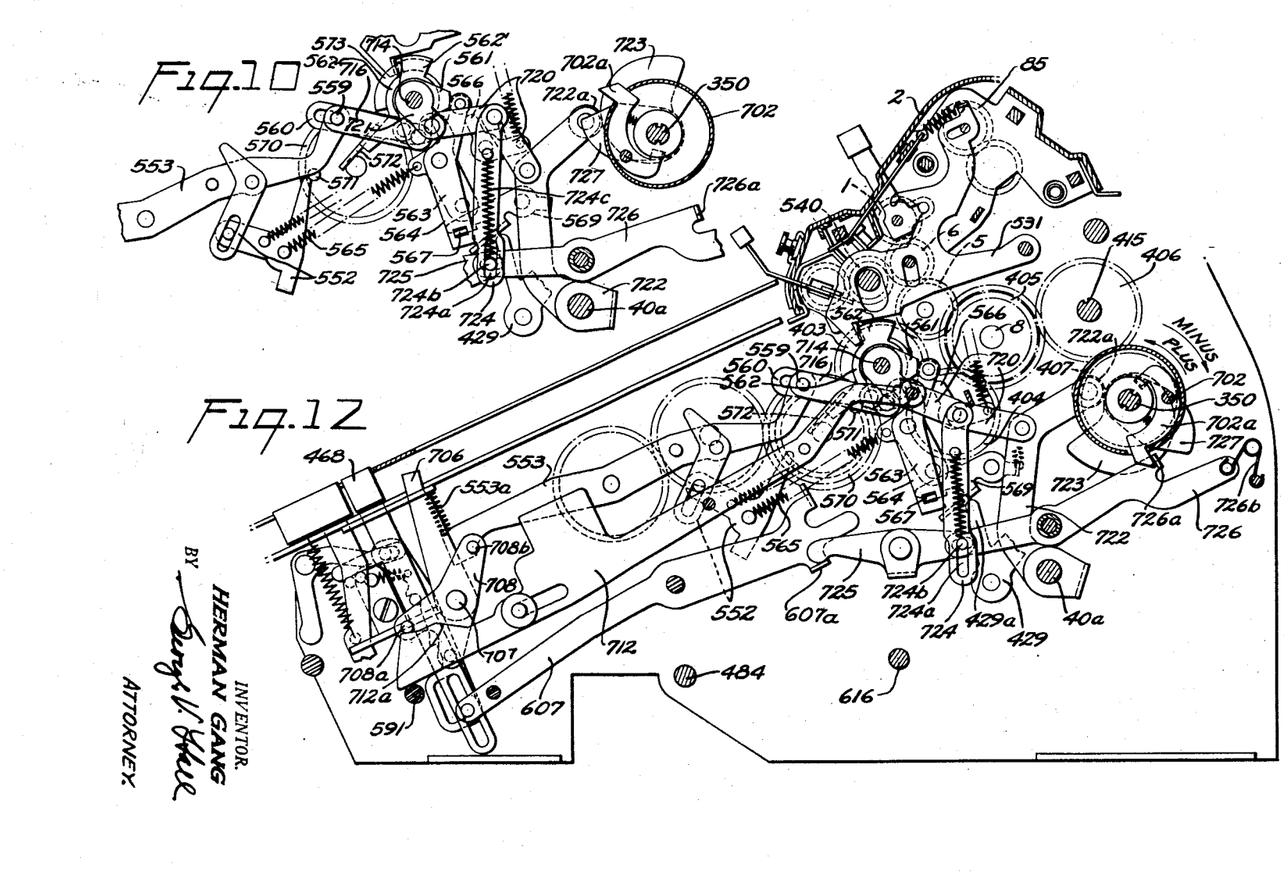
Fig. 10 is a fragmentary right side elevation showing the factor entering mechanism in a multiplier entering operated position.
Fig. 12 is a right side elevation with parts in section showing the factor entering mechanism in a dividend entering operated position and control devices operated to set the keyboard locking means.
Figures 13, 14:
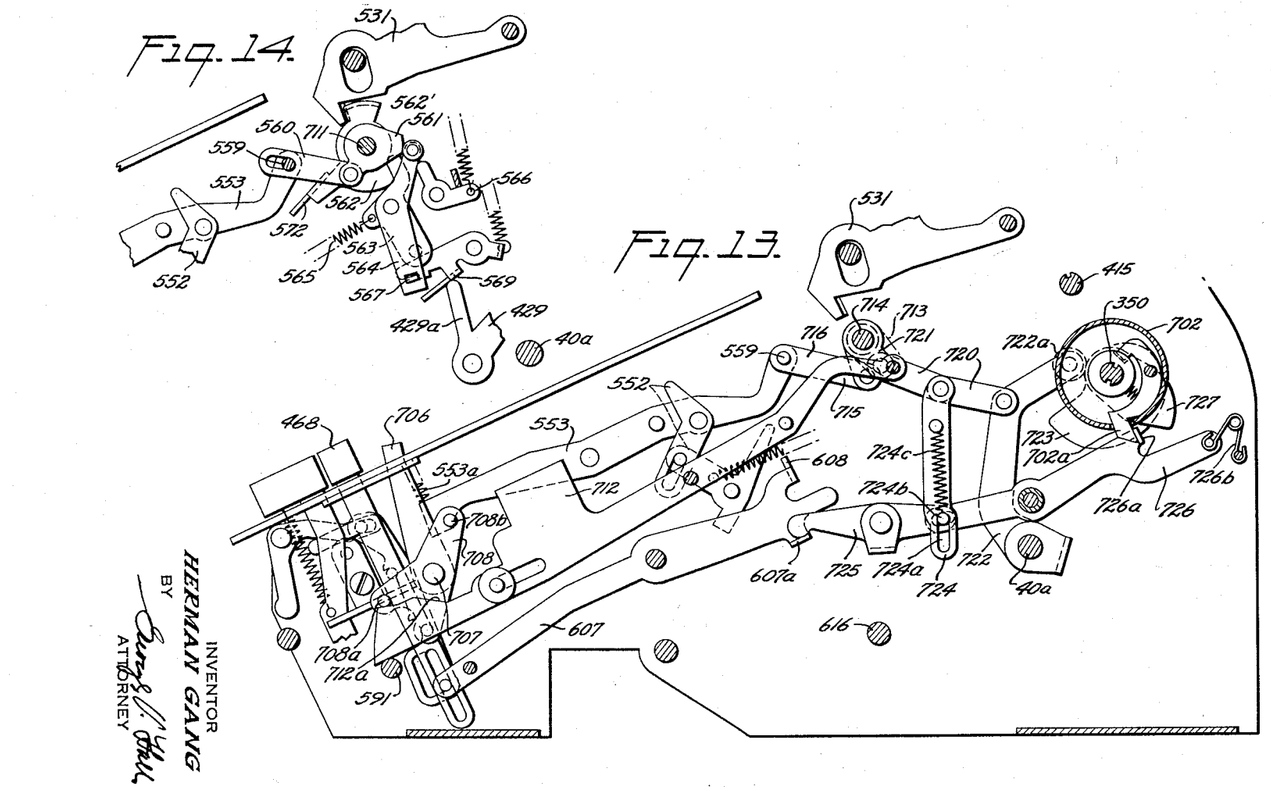
Fig. 13 is a fragmentary detailed right side view of parts of Fig. 12 to more clearly show the operated dividend entering mechanism.
Fig. 14 is a fragmentary detailed right side view of parts of Fig. 12 to more clearly show the cycle control means for the registering mechanism in an operated position.

Normally shaft 415 is driven at a one to one ratio with the digital and tens-transfer actuators 3 and 4 by a gear 700 (Figs. 7, 9) splined on said shaft outwardly from idler gear 406 of the actuator drive train and meshing with a gear 701 fast on the driven member of a clutch 702, the driving member of which is fast on shaft 350 (Figs. 12, 13). As will be hereinafter described, means is provided to disengage clutch 702 thereby disabling the counter actuator drive means upon operation of the factor entering means in the dividend entering operation.

Means is provided to locate the cyclically operable registering mechanism in full cycle position. This means comprises a locator cam 153 (Fig. 3) fast on shaft 350 of the actuator drive train and normally engaged at oppositely opposed low sides by a pair of locator arms 422 which have common pivotal mounting at their lower ends on a rock shaft 40a. Upon initial operation of the registering mechanism arms 422 are moved outwardly from the position shown in Figure 3 by cam 153 and then held in said outward position from engagement with said cam by a toggle 423 as said registering mechanism is cycled.

As an incident to a stopping operation for the registering mechanism, said mechanism is overrun beyond full cycle position, as fully disclosed in the aforenoted Patent No. 2,531,207, and then rebounded to full cycle position. A normally inactive drive train (not shown) is reciprocated during the overrun and rebound of the registering mechanism. This drive train, during the overrun of the registering mechanism, is operable to rock a rearwardly extending arm 429 counterclockwise from the position shown in Figs. 3, 5, and during the rebound of said mechanism is operable to restore said arm. During its counterclockwise movement, arm 429 will engage and break toggle 423 thereby permitting locator arms 422 to be spring moved inwardly to engage locator cam 153. Thus, as the registering mechanism rebounds, arms 422 will move inwardly to engage the low sides of cam 153 thereby locating said registering mechanism in full cycle position.

*Digital value selection means and keyboard lock*

The digital value selection means for setting digital actuators 3 is constructed and operates substantially in accordance with the disclosure of applicant's copending application Serial #435,435, filed on June 9, 1954. The selection means includes a keyboard having a row of 1 to 9 digital value keys 22 (Figs. 1 and 2) for each actuator 3. Keys 22 of each row are held in retracted position by a spring 23 common to all of the keys of the row and engaging a recess of a shoulder at the right side of the lower end of each key stem.

Each row of keys 22 has a latching slide 28 which is adapted to latch any key in the row in depressed position, and upon depression of any key in the row the slide is moved to release any previously latched key. Slides 28 are spring urged toward the front of the machine and have a series of depending lugs 28a each having a cam edge normally engaged by the underside of a shoulder 22a at the left side end of the stem of one of the keys 22 of the associated row.

Upon depression of a key 22, its shoulder 22a engaging the cam edge of a lug 28a will move the associated slide 28 toward the rear. As shoulder 22a passes below lug 28a, slide 28 will be allowed movement by its spring toward the front of the machine thereby positioning lug 28a above shoulder 22a to latch key 22 in depressed position.

Each lug 28a has an inclined edge at its forward under side. Therefore, when a key 22 is latched in depressed position and another key in the same row is depressed, the inclined edge at the under side of lug 28a holding the latched key will be moved to the rear of shoulder 22a of said key and spring 23 will then be effective to raise said key to retracted position. Upon further downward movement of the key which is being depressed, slide 28 will be restored forwardly to latch said key in depressed position. Keys 22 perform no operation upon depression other than to position their stems to control a subsequent setting operation for digital actuators 3.

The cyclically operable registering mechanism has an idle phase at the beginning of each cycle of operation. During the idle phase of the initial cycle of operation of the registering mechanism, the selection mechanism is operable to set digital actuators 3 under control of set keys 22 of the keyboard.

Figures 7, 8:
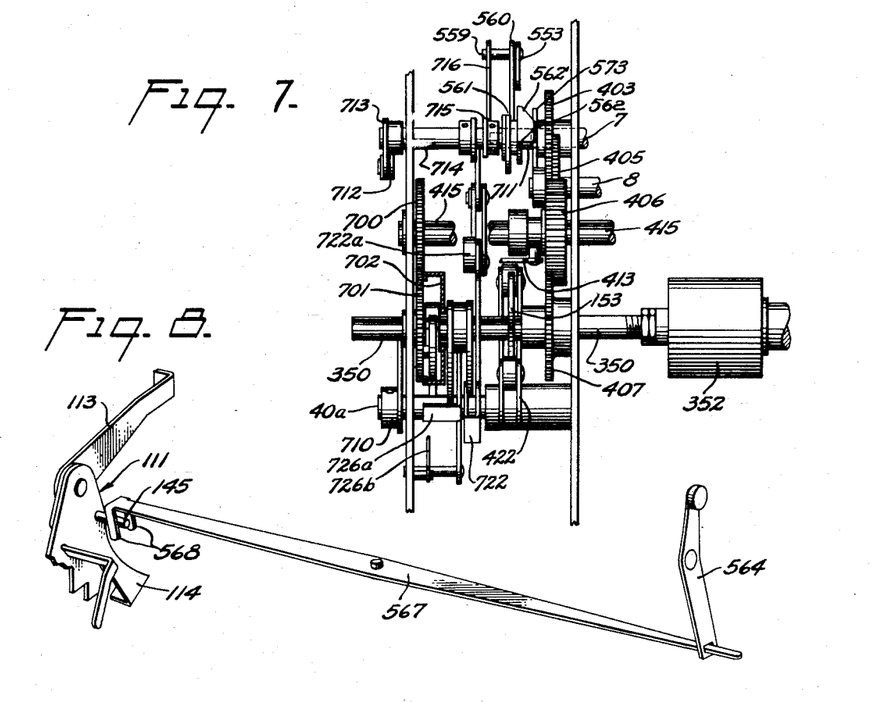

The setting means includes a cam 26 (Fig. 1) fast on shaft 350 which is driven by friction clutch 352 (Fig. 7). Upon rotation of registration drive shaft 350 and cam 26, a lever 40 fast on shaft 40a will be rocked clockwise (Fig. 1) to move a link 39 toward the front of the machine. Forward movement of link 39 will be effective to operate the selection mechanism under control of set keys 22 to set digital actuators 3. The devices of the invention, however, are not concerned with the setting operation of the selection mechanism and reference is made to said application Serial No. 435,435 for a complete disclosure of this operation.

Latching means is provided to hold lever 40 (Fig. 1) in operated position until termination of operation of the registering mechanism. But for this provision, actuators 3 would be set and restored at the beginning and end of both cycles of a multiplier entering operation and during each cycle of a program of multiplication or of division. This oscillatory movement would obviously be undesirable. The latching means includes an arm 710 (Fig. 9) fast on shaft 40a which is rocked by setting lever 40 (Fig. 1) upon initial operation of the registering mechanism. Means, hereinafter described in connection with control of the keyboard locking means, is effective to latch arm 710 and shaft 40a in rocked position thereby holding actuators 3 in set adjusted position.

Figure 2:
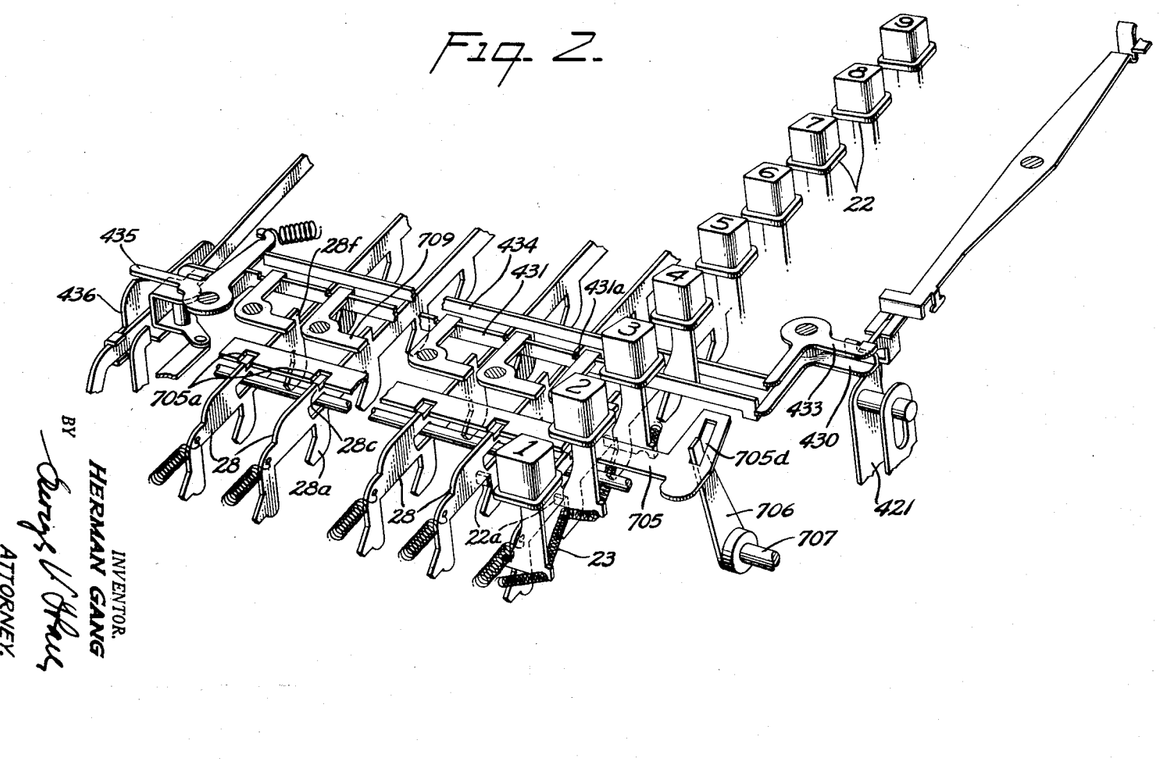
Fig. 2 is a fragmentary perspective of the keyboard and associated controls.

A keyboard locking device is provided to prevent both depression and retraction of keys 22. The keyboard lock comprises a slide 705 (Figs. 1 and 2). Slide 705 runs transversely of the machine above latch slides 28 of the keyboard. Each latch slide 28 of each of the key rows has a shoulder 28c at its upper edge normally a slight distance forwardly of the front edge of slide 705. To the rear of and in registration with each shoulder 28c is a recess 705a in slide 705. Upon depression of a key 22 and the attendant rearward movement of the associated slide 28, the shoulder 28c of said slide will enter the aligned recess 705a of lock slide 705. Normally, therefore, slide 705 will be ineffective to prevent depression and retraction of keys 22. However, upon adjustment of slide 705 toward the right from the position shown in Figure 2, recesses 705a will be moved to the right and out of registration with the associated shoulders 28c of latch slides 28. Keys 22 therefore will be locked against depression by engagement of their lugs 22a with cam edges 28a of the associated slides 28 which are blocked from rearward movement by engagement of their shoulders 28c with the front edge of lock slide 705. Furthermore, it will be obvious that slides 28, blocked from rearward movement, will hold any depressed keys against retraction.

Means to move slide 705 to and from locking position comprises an upstanding arm 706 (Fig. 2), the upper end of which engages a cam slot 705d at the right end of said slide. Arm 706 is fixed at its lower end on a rock shaft 707 which, as hereinafter described, is controlled by a crank 708 (Figs. 3, 12, 13, 15, 16) fast on said shaft. Upon clockwise movement from the position shown in Figure 2, the upper end of arm 706, by engagement with the right edge of cam slot 705d, will move slide 705 to the right and thus into position to block slides 28 from rearward movement. When arm 706 is restored counterclockwise, the left edge of cam slot 705d will be engaged by said arm thereby restoring slide 705 toward the left to unlock the keyboard.

Power driven means is operable to clear the keyboard and simultaneously to initiate operation of stopping means for the registering mechanism, and alternatively to initiate operation of said stopping means without effecting the clearing operation. The key releasing means comprises a slide 431 (Figs. 1 and 2) extending across the machine above latch slides 28. Slide 431 is provided with a series of recesses 431a in its upper edge, each of which engages an arm of a bell crank 709, the other arm of which engages a lug 28f at the upper edge of each of the slides 28. One arm of a bell crank 430 engages the right end of slide 431 and the other arm of said bell crank is adapted for engagement by a trigger 421.

Trigger 421 is power operated in timed relation with the registering mechanism in conjunction with operation of the factor entering devices to rock lever 430 clockwise (Fig. 2) thereby moving slide 431 toward the left. Upon leftward movement of slide 431, bell cranks 709 engaged by recesses 431a will be rocked counterclockwise. Counterclockwise movement of bell cranks 709, by engagement thereof with lugs 28f, will be effective to move slides 28 toward the rear thereby releasing any keys which may be in set position. Furthermore, upon leftward movement of slide 431, a lug adjacent its left upper end will rock a bell crank 435 counterclockwise to depress an arm 436. Depression of arm 436 will initiate operation of the registration stopping means as fully disclosed in the aforenoted Patent #2,531,207.

Trigger 421 is also adapted to rock another bell crank 433 to initiate operation of the registration stopping means, independently of operation of the keyboard clearing means, by moving a slide 434 toward the left. The left end of slide 434 engages the arm of bell crank 435 which is also engaged by slide 431. Therefore, upon leftward movement of slide 434 bell crank 435 will be operated to initiate operation of the stopping means.

The control of the operation of trigger 421 in the operation of the keyboard clearing and registration stopping means in conjunction with the multiplier entering operation of the factor entering means is substantially in accordance with the aforenoted Patent #2,531,206. The present invention is not concerned with these operations and reference is made to said patent for a complete disclosure thereof.

In the dividend entering operation of the factor entering means, trigger 421 is controlled substantially as disclosed in said Patent #2,531,206 to effect the simultaneous keyboard clearing and stopping operations at the end of the additive cycle of registration. The devices of the present invention, as will be hereinafter described, eliminate the subtractive cycle of the registering mechanism of the dividend entering operation of said patent.

*The factor entering devices (general description)*

In response to depression of a key 526 (Figs. 3, 4), spring impelled mechanism is released thereby initiating a multiplier entering operation of the factor entering devices. If carriage 2 is in the left end position, the spring impelled mechanism will be immediately effective to initiate a single additive cycle of operation of the registering mechanism. This additive cycle of operation will transfer the multiplier value set in the keyboard into wheels 1 of the accumulator register. At the conclusion of the additive cycle of registration, a sub-carriage 525 longitudinally shiftable in main carriage 2 and having an ordinal series of normally disengaged multiplier storage gears 540 (Figs. 1, 3) mounted therein will be shifted to engage said storage gears with a respective series of intermediate gears 6 of the accumulator register in which the multiplier value has been entered. After this, a single subtractive cycle of the registering mechanism will be instituted. The value set on the keyboard will therefore be subtracted from the accumulator register and entered into multiplier storage gears 540. Upon termination of the single subtractive cycle of registration, the keyboard will be automatically cleared so that the multiplicand for the subsequent program of multiplication may be entered thereon.

If register carriage 2 is displaced from its left end position, delay devices are positioned so that upon depression of key 526 a left carriage shifting operation is initiated and the operation of the spring impelled mechanism will be held in abeyance. The carriage shifting operation will be terminated upon movement of the carriage into its left end position and thereupon the spring impelled mechanism will be released to initiate the multiplier entering operation.

The means whereby a carriage shifting operation is initiated upon depression of key 526, and the means whereby the multiplier entering operation of the factor entering devices is held in abeyance until termination of the said carriage shift is fully disclosed in Patent #2,684,809. The control of subcarriage 525 to effect engagement and disengagement of storage gears 540 in the multiplier entering operation is fully disclosed in Patent #2,531,206. Reference is made to the above patents for a detailed description of the above operations.

In response to depression of a key 468 (Figs. 3, 6, 12, 13), the spring impelled mechanism is released to initiate a dividend entering operation of the factor entering devices. If the register carriage 2 is in its right end position, or in the position of a set tabular key (not shown) the dividend entering operation will be initiated forthwith. If, however, the register carriage is displaced from the selected or the end position, a rightward shift of the carriage will be instituted and means will be adjusted to hold the operation of the spring impelled mechanism in abeyance.

Upon termination of the carriage shift in the end or in the selected position, the spring impelled mechanism will be permitted operation to initiate the single additive cycle of operation of the registering mechanism. The means whereby the carriage shift operation is instituted upon depression of key 468, and whereby the operation of the spring impelled mechanism is held in abeyance is fully disclosed in the above noted Patent #2,684,809 to which reference is made for a complete disclosure thereof.

In the dividend entering operation as disclosed in the aforenoted patents, the single additive cycle of operation is followed by a subtractive cycle to remove the unwanted count of 1 from the counter register.

The devices of the present invention, as heretofore noted, eliminate the subtractive cycle of registration in the dividend entering operation. The invention therefore concerns control of the registration initiating and terminating devices of the factor entering means in conjunction with a novel keyboard locking arrangement. The devices otherwise operate in accordance with the patents hereinbefore referred to. The following descriptions will therefore be confined to the registration control operations of the devices and the keyboard locking arrangement.

*Factor entering devices (multiplier entering operation)*

Depression of key 526 is operable to release spring impelled mechanism comprising a lever 553 (Figs. 3, 4, 5, 6, 10). Lever 553 is normally held in the counterclockwise position shown in Figures 3, 6 by a toggle comprising links 552. At the lower end of the stem of key 526 is mounted a trigger 551 which overlies a lug of a leftwardly extending arm of lower toggle link 552.

Upon downward movement of key 526, trigger 551 will engage and rock lower toggle link 552 counterclockwise to break the toggle and thereby release lever 553 for clockwise movement. Upon release of lever 553 said lever will be rocked clockwise from the position shown in Figure 3 to the position of Fig. 10 by a spring 553a.

At its right end lever 553 has a pin 559 which normally engages the left end of a slot in a rightwardly extending link 560. The right end of link 560 has pivotal connection with a pair of cams 561 and 562 which are rotatably mounted as a unit on a shaft 711 best shown in Figure 7. Shaft 711 is axially alined but not connected with shaft 7 on which digital actuators 3 are mounted.

During the first part of the rocking movement of lever 553, pin 559 at the right end thereof will be moved idly to the opposite end of the slot of link 560. Then if carriage 2 is in the left end position, said lever will complete its rocking movement and pin 559 will be effective to move link 560 toward the right thereby rotating cams 561 and 562 counterclockwise to the position shown in Figure 10. If, however, carriage 2 is displaced from the left end position, further clockwise movement of lever 553 will be blocked when pin 559 has been moved to the opposite end of the slot of link 560 and a leftward shift of the carriage will be instituted as fully disclosed in the aforenoted Patent #2,684,809. When the carriage shift is terminated in the left end position, lever 553 will be released to complete its clockwise movement, as disclosed in said patent, to rotate cams 561 and 562 thereby completing its operation.

Cams 561 and 562 are adapted to control operation of a rock arm 563 and a registration sign control lever 564 (Figs. 3, 5, 8, 10, 11, 12). Arm 563 is pivotally mounted at its lower end on the machine framing, and a spring 565 urges said arm counterclockwise to hold its upper free end which terminates in a nose normally in engagement with the low portion of cam 562.

Figure 3:
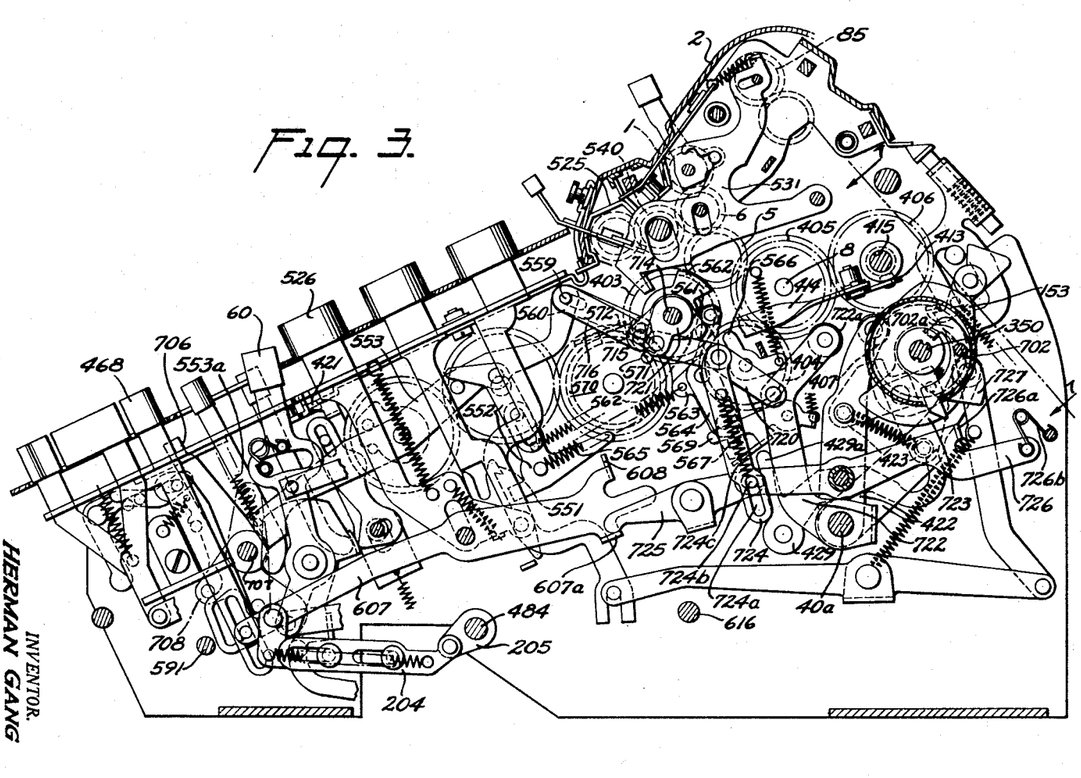
Fig. 3 is a right side elevation of the machine showing the factor entering mechanism in normal position and the drive train for the registering mechanism.
Figures 4, 5:
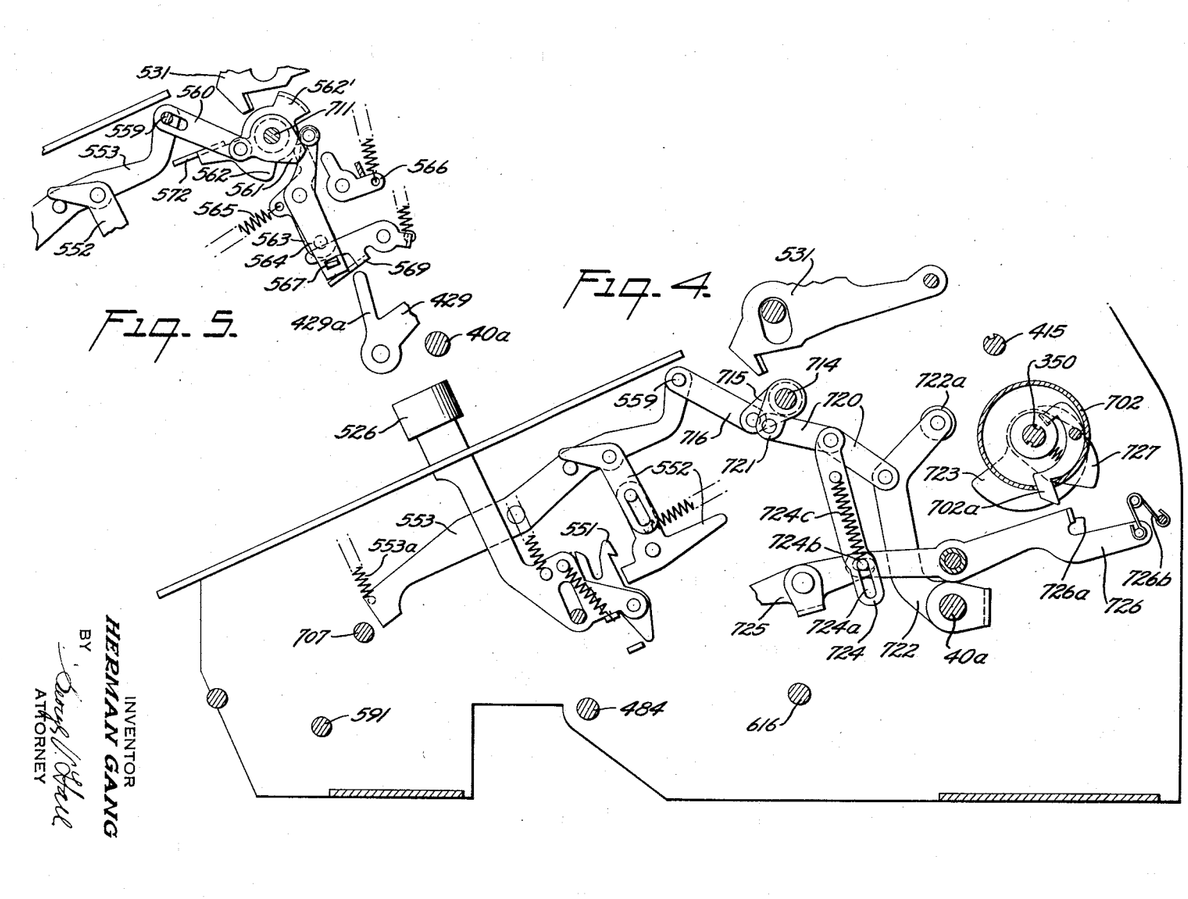
Fig. 4 is a fragmentary detailed right side view of parts of Fig. 3 to more clearly show the factor entering mechanism and the associated means for initiating a multiplier entering operation.
Fig. 5 is a fragmentary detailed right side view of parts of Fig. 3 to more clearly show the cycle control means for the registering mechanism.

Lever 564 is pivotally mounted intermediate its ends on arm 563. At its upper free end, lever 564 is provided with an anti-friction roller which normally engages cam 561 with the high portion of said cam in clockwise position from engagement therewith as shown in Figure 3.

The lower end of lever 564 has slot engagement with the rightmost end of a lever 567 which extends transversely across the machine (Fig. 8) and is provided at its left end with a pair of depending ears 568.

Ears 568 are positioned at opposite sides of a pin 145 which extends inwardly from clutch lever 111. Ears 568 are sufficiently spaced to permit clutch lever 111 to be operated in other machine operations without interference by said ears. When clutch 111 is in centralized neutral position, lever 567 is restrained to limited movement by engagement of ears 568 with pin 145; and when said lever is so contained within this limit, a tooth of a spring urged latch 569 will ineffectively engage the upper face of said lever adjacent its right end as shown in Figure 3.

When the parts are moved to the position shown in Figure 10, the low portion of cam 562 will still be in engagement with the nose of arm 563 with the high portion of said cam moved immediately adjacent said nose. It will be observed, therefore, that no rocking motion will be imparted to arm 563 and the pivotal mounting thereon of lever 564 will also remain stationary. However, upon counterclockwise movement of cam 561, its high portion will be moved into engagement with the roller at the end of lever 564 and said lever will be rocked clockwise as shown in Figure 10. Clockwise movement of lever 564 will rock lever 567 toward the left to the position shown in Figure 10 (clockwise from the position shown in Fig. 8) thereby engaging the left ear 568 with pin 145 to rock clutch lever 111 to initiate the single additive cycle of operation of registering mechanism. Furthermore, upon adjustment of lever 567, the tooth of latch 569 will be lowered to hold the adjustment of said lever as shown in Figure 10. In addition to the above adjustments, clockwise movement of lever 564, as shown in Figure 10, will position its upper end immediately adjacent an upstanding arm of a bell crank 566 which normally is spring urged counterclockwise against a fixed stop.

A further relative adjustment of the parts is effected upon counterclockwise rotation of cam 562 to the position of Fig. 10. Integral with cam 562 is an extension comprising a thrust cam 562' most clearly shown in Fig. 7. Upon rotation of cam 562 to the position of Fig. 10, the active edge of thrust cam 562' is brought immediately adjacent a depending nose at the forward end of a plate 531 (Figs. 3, 4, 5, 10). Plate 531 is loosely mounted at its rear in the right end of main carriage 2 and is therefore inwardly and outwardly yieldable adjacent its front end. The right end of longitudinally adjustable sub-carriage 525 engages the inner face of plate 531 adjacent its front end. Sub-carriage 525 is normally spring held to the right within main carriage 2 thereby normally locating storage gears 540 (Figs. 1, 3) disengaged from intermediate gears 6 and the front end of plate 531 in outward position. Upon further counterclockwise rotation of cam 562, as later described, thrust cam 562' will engage the nose of plate 531 thereby adjusting the front of said plate inwardly and adjusting sub-carriage 525 toward the left to engage multiplier storage gears 540 with intermediate gears 6 of the accumulator register.

In the initial movement of lever 553 as pin 559 moves idly in the slot of link 560, means is operable to set the keyboard locking means. The devices for operating the keyboard locking means comprises a slide 712 (Figs. 9, 12, 13). Slide 712 extends toward the front of the machine and at its rear end it is pivotally connected with a crank 713. Crank 713 is fixed on a shaft 714 which is rotatably mounted in auxiliary framing of the machine and is in axial alinement with shaft 711 on which cams 561 and 562 are mounted and with digital actuator shaft 7 as best shown in Figure 7. Fixed on shaft 714 is a crank 715 which has link connection 716 with pin 559 of lever 553.

When lever 553 is rocked clockwise in its initial movement, shaft 714 will be rocked counterclockwise by crank 715 and link 716. Counterclockwise movement of shaft 714 will move slide 712 through crank 713 toward the rear of the machine from the position shown in Figure 9 to the position shown in Figures 12, 13. The forward end of slide 712 is provided with a cam edge 712a which engages a pin 708a of an arm of crank 708. In the initial rearward movement of slide 712, cam edge 712a will be effective to rock crank 708 clockwise to the position shown in Figures 12, 13. Clockwise movement of crank 708 will likewise move arm 706 thereby moving slide 705 to the right from the position shown in Figure 2 to lock the keyboard as hereinbefore described.

Mounted on slide 712 intermediate its ends and spring urged counterclockwise is a release lever 717 (Fig. 9) for the keyboard locking means. Normally lever 717 is held clockwise as shown in Figure 9 by a pin 710a of arm 710. The front end of lever 717 is normally above and a slight distance to the rear of a pin 708b on an upstanding arm of crank 708. Crank 708 therefore may be rotated clockwise to lock the keyboard in connection with other machine operations without interference by the end of lever 717.

When slide 712 is moved toward the rear to effect the keyboard locking operation, lever 717 will likewise be moved thereby maintaining the rearward position of its front end with relation to pin 708b as said pin is rocked clockwise with crank 708. When shaft 40a and arm 710 are rocked clockwise in the setting operation for the digital actuators during the idle phase of the additive cycle of the multiplier entering operation, pin 710a will permit counterclockwise movement of lever 717 from the position shown in Figure 9 so that its front end will be lowered to the rear of pin 708b of crank 708.

Means is provided, upon operation of crank 708 to set the keyboard locking means, to latch arm 710 and shaft 40a in clockwise position thereby maintaining the setting of digital actuators 3 until release of said keyboard locking means. The latching means for arm 710 comprises an upstanding lever 718 (Fig. 9). The depending arm of lever 718 has yieldable link connection 719 with crank 708. Upon clockwise movement of crank 708 in the keyboard locking operation, the connection between link 719 and lever 718 will yield and the upper end of said lever will be urged against the end of arm 710. When arm 710 is moved clockwise in the setting operation of the digital actuators in the idle phase of the additive registering cycle, the upper end of lever 718 will be moved below the end of arm 710 thereby latching said arm in clockwise position.

Figure 11:
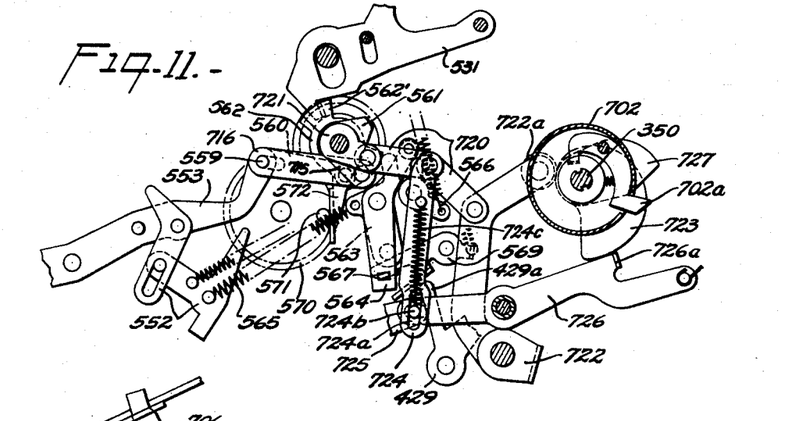
Fig. 11 is a fragmentary right side elevation of parts shown in Fig. 10 in another multiplier entering operated position.
Figure 12:
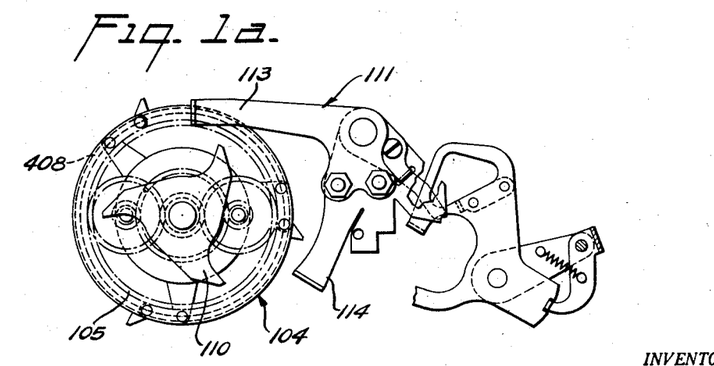

At the conclusion of the additive cycle of the multiplier entering operation, means is operable to initiate the single subtractive cycle of registration. Engaged with gear 403 (Figs. 3, 10, 11) of the register drive train is an idler gear 570. Upon additive operation of the register drive train, gear 570 will be driven clockwise. Mounted on gear 570 is a pin 571. During clockwise rotation of gear 570 in the additive cycle of registration pin 571 will engage a rightwardly extending arm of lower toggle link 552. Lower toggle link 552 has slot and pin connection with the upper link of said toggle. By virtue of this connection, the lower link of the toggle will be permitted counterclockwise idle movement to permit passage of pin 571 as shown in Figure 10. Near the end of the additive cycle of registration, pin 571 will be moved into engagement with a depending arm 572 of cam 562. As an incident to termination of the additive cycle of registration, the registering mechanism is overrun beyond the full cycle position and then restored to full cycle position. In the overrun of the parts beyond full cycle position, pin 571 will rotate cam 561 and cam 562 further in counterclockwise direction through arm 572 as shown in Figure 11. During this further counterclockwise movement the high portion of cam 562 will be moved into engagement with the nose of arm 563 thereby rocking said arm clockwise against the tension of spring 565 as shown in Figure 11. Also during this further counterclockwise movement of cam 562, integral cam 562' will engage the nose of plate 531 thereby moving said plate inwardly to engage multiplier storage gears 540 with intermediate gears 6. During these operations, the tooth of latch 569 will still be engaged with lever 567 thereby blocking movement of the lower end of lever 564 toward the right as arm 563 is rocked clockwise. The upper end of lever 564 will therefore be urged toward the right against the arm of crank 566 thereby rocking said crank clockwise against the tension of its spring as shown in Figure 11.

Arm 429 as hereinbefore described is rocked counterclockwise upon overrun of the registering mechanism to break toggle 423 (Fig. 3) thereby releasing locator arms 422. Arm 429 is provided with a finger 429a which, as said arm completes its counterclockwise movement, will engage and thereby rock latch 569 clockwise, from the position shown in Figure 8, to release lever 567 and arm 564. Clutch lever 111 will now be moved to neutral position by the stopping means and when the parts have been restored to full cycle position, bell crank 566 will be restored counterclockwise from the position shown in Figure 11. Bell crank 566 in its counterclockwise movement will rock lever 564 counterclockwise thereby rocking lever 567 counterclockwise (Fig. 8) to adjust clutch lever 111 clockwise to initiate a subtractive cycle of registering operation. In its counterclockwise movement, the upper face of lever 567 will pass to the right of the tooth of latch 569 which will then be moved counterclockwise to latch the parts in subtractive position.

In the terminal counterclockwise movement of cams 561 and 562, link 560 will be moved toward the right to position the left end of its slot immediately adjacent pin 559 of lever 553 as shown in Figure 11. During the subtractive cycle of registration, pin 571 of gear 570 will engage the upper side of the rightwardly extending arm of lower toggle link 552 thereby rocking said link 552 clockwise from the position shown in Figure 11 to reset the toggle. Resetting of toggle 552 will restore lever 553 counterclockwise and through link 560 will rotate cams 561 and 562 clockwise to normal. Furthermore, as the subtractive registering operation is terminated latch 569 will be released by arm 429 and levers 564 and 567 will be restored to normal.

The power operated means which restores lever 553 and the associated mechanisms is also operable to positively release the keyboard locking means. The power release of the keyboard lock provides for release of the keys 22 regardless of premature or inadvertent pressure on said keys by the operator. Should pressure be applied to any of keys 22 while slide 705 is in locking position, shoulders 28c of the associated slides 28 (Figs. 1 and 2) will be urged against the front edge of said slide 705. From the above it will be observed that if slide 705 were spring retracted said spring means would most likely be ineffective because of the friction between shoulders 28c and slide 705. Therefore, it would be necessary for the operator to first release keys 22 and then apply pressure to depress said keys.

Figure 6:
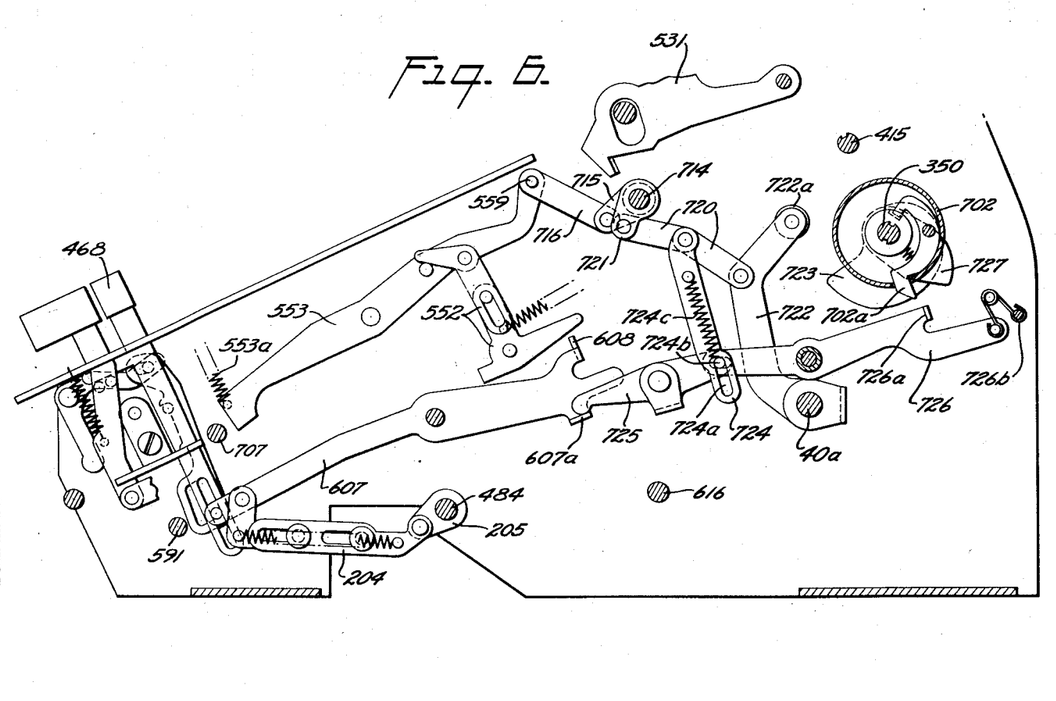
Fig. 6 is a fragmentary detailed right side view of parts of Fig. 3 to more clearly show the factor entering mechanism and the associated means for initiating a dividend entering operation.

Upon counterclockwise movement of lever 553 to restored position, link 716 will be effective to rock shaft 714 clockwise to the normal position shown in Figure 6 thereby restoring slide 712 toward the front of the machine. This operation will move cam edge 712a forwardly of pin 708a thereby releasing crank 708 for counterclockwise movement. Simultaneously with the forward movement of slide 712, the front end of lever 717 will engage pin 708b thereby rocking crank 708 and arm 706 counterclockwise to positively move lock slide 705 toward the left to release the keyboard. Furthermore, upon counterclockwise movement of crank 708, link 719 will be restored toward the rear of the machine thereby rocking lever 718 to the normal position shown in Figure 6 to release arm 710 thereby releasing the setting mechanism for the digital actuators which will then be restored to normal.

*Factor entering devices (dividend entering operation)*

In response to depression of key 468 (Figs. 3, 6, 12, 13) power driven means is operable to break toggle 552 thereby releasing spring impelled lever 553 to initiate the dividend entering operation. The power driven means comprises shaft 484 (Figs. 3, 6) which is rocked counterclockwise and returned as an incident to a clearing operation for the accumulator and counter registers. This operation is performed prior to the dividend entering operation.

Fast on shaft 484 is a chank 205 which through a link 204 is connected with a lever 607 at its forward end. When shaft 484 is rocked counterclockwise, link 204 is moved toward the rear of the machine thus rocking lever 607 counterclockwise from the position shown in Figures 3, 6 to the position shown in Figures 12, 13. Upon counterclockwise movement of lever 607, a lug 608 at its right end will engage the rightwardly extending arm of lower toggle link 552 thereby breaking the toggle and releasing spring impelled lever 553.

Released lever 553 will operate the registration control devices to initiate the additive cycle of registration of the dividend entering operation substantially as described in connection with initiation of the additive cycle of registration of the multiplier entering operation. If register carriage 2 is in the right end position, the dividend entering operation will be initiated immediately upon release of lever 553. If, however, the carriage is out of the right end position, the operation of lever 553 will be held in abeyance and a right carriage shift will be instituted. Upon termination of the carriage shift in the end position or in a position corresponding to a set tabular key (not shown), the operation of lever 553 to initiate the dividend entering operation will be effective. The above operations in response to depression of key 468 and release of lever 553 are effected substantially in accordance with Patent No. 2,684,809 to which reference is made for a detailed description. Furthermore, upon release of lever 553, the keyboard locking means will be set substantially as described in connection with the multiplier entering operation.

Upon counterclockwise movement of lever 607 to break toggle 552, control devices of the invention are adjusted to limit the dividend entering operation to the single additive cycle of registration. These devices include a normally broken toggle comprising a pair of substantial horizontal links 720. The end of the leftmost toggle link 720 has pivotal connection with a crank 721 fast on shaft 714. The rightmost toggle link 720 has pivotal connection at its end with a rock arm 722 intermediate its ends. Arm 722 is pivotally mounted at its lower end on shaft 40a and at its upper end said arm is provided with an anti-friction roller 722a which is adapted for engagement with a snail type cam 723 fast on shaft 350 of the registration driving mechanism.

At the point of connection of toggle links 720, a downwardly extending link 724 is pivotally mounted at its upper end. At its lower end link 724 is provided with a slot 724a which is engaged by a pin 724b which connects the adjacent ends of a pair of levers 725 and 726. A toggle spring 726b normally holds lever 726 in the clockwise position shown in Figure 3 and by connecting pin 724b it holds lever 725 in counterclockwise position. A spring 724c is connected to link 724 adjacent its upper end and to pin 724b. Spring 724c therefore normally holds link 724 downwardly with the upper end of its slot in engagement with pin 724b as shown in Figures 3, 6.

The above described devices are disabled during the multiplier entering operation hereinbefore described. During the multiplier entering operation and the attendant counterclockwise movement of shaft 714 toggle links 720 will be moved toward the right by crank 721. This operation will move anti-friction roller 722a of arm 722 into engagement with the low portion of snail cam 723. Upon operation of the registering mechanism and rotation of cam 723, arm 722 will be rocked counterclockwise. However, at this time toggle 720 will be broken and the leftmost link 720 of said toggle will be rotated counterclockwise about its crank connection 721 with shaft 714 as shown in Figure 10; which operation will be permitted by slot 724a at the end of link 724. During the subtractive cycle, of the multiplier entering operation, the parts will be restored and roller 722a will be moved out of the path of cam 723.

The above normally disabled devices are enabled upon counterclockwise movement of lever 607, from the position shown in Figures 3, 6 to the position shown in Figures 12, 13, to initiate the dividend entering operation. A lug 607a at the right end of lever 607 underlies the left end of lever 725. Therefore, upon counterclockwise movement of lever 607, lever 725 will be rocked clockwise and connected lever 726 counterclockwise to the positions shown in Figures 12, 13. When levers 725 and 726 are rocked pin 724b will be moved downwardly to lower link 724 by the urge of spring 724c. This will lower the point of connection of toggle links 720 thereby setting the toggle as shown in Figures 12, 13. After this operation lever 607 will be restored clockwise but the parts adjusted thereby will be held in position by toggle spring 726b.

When shaft 714 is moved counterclockwise by lever 553 to initiate the additive cycle of registration, arm 722 will be rocked clockwise to bring anti-friction roller 722a into engagement with snail cam 723 (Figures 12, 13). During the additive cycle of operation, snail cam 723 will rock arm 722 counterclockwise from the position shown in Figures 12, 13. Therefore set toggle links 720 through crank 721 will be effective to restore shaft 714 clockwise. Link 715 which has crank connection with shaft 714 at one end and with lever 553 at the other end will therefore be effective to restore said lever counterclockwise to normal position and thereby reset restraining toggle 552.

During the above operation, pin 571 will be rotated clockwise by gear 570 as described in connection with the multiplier entering operation. However, as pin 571 approaches arm 572 of cam 562 said cam and arm will be rotated clockwise in the resetting operation by toggle 720. The timing of the parts is such that arm 572 will be moved out of the path of movement of pin 571 and therefore the operation of the registering mechanism will be terminated at the end of the additive cycle with the registration control devices restored to normal. Upon movement of the registration control devices to normal position the keyboard locking means will be released as described in connection with the multiplier entering operation.

Means is provided to prevent registration in counter register 85 during the single additive cycle of operation. This means includes a normally engaged clutch 702 which, as hereinbefore described, drives the counter actuator 412 through a train including gears 700 and 701. Clutch 702 is of well-known construction wherein a spring urged pawl 702a attached to the driven member of the clutch engages the driving member to engage said clutch. Lever 726 has a lug 726a adjacent its right end which is normally below and out of the path of movement of a nose of clutch pawl 702a which extends outwardly through the clutch housing. When lever 726 is rocked counterclockwise in the initiation of the dividend entering operation, lug 726a will be raised into the path of movement and immediately adjacent the nose of clutch pawl 702a. Therefore, when clutch pawl 702a is rotated counterclockwise a slight distance, upon initial operation of the machine drive in the additive cycle of operation, said pawl will be engaged by lug 726a thereby moving said pawl from engagement with the driving member of the clutch and thus disengaging the counter actuator drive means. A restoring cam 727 is fast on registration drive shaft 350 and just prior to the end of the additive cycle of registration said cam will engage lug 726a thereby rocking arm 726 clockwise from the position shown in Figure 12 to the position shown in Figure 3. This operation will permit clutch pawl 702a to drop in and reengage clutch 702 at the end of the registering operation. Furthermore, counterclockwise movement of lever 726 will restore lever 725, link 724 and toggle links 720 to the normal positions shown in Figures 3, 6.

*Division and multiplication (the keyboard lock)*

Means is operable during a program of division and of multiplication to set the keyboard locking means and to release said locking means by power operated devices.

Figure 15:
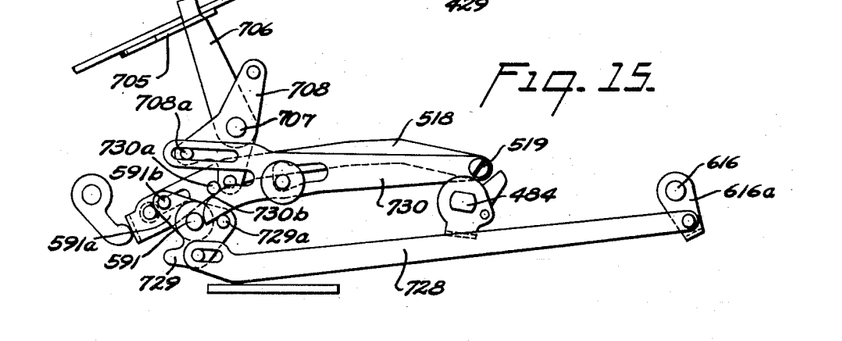
Fig. 15 is a fragmentary right side elevation showing the control devices operated to set the keyboard locking means in response to initiation of a program of division.

As fully disclosed in applicant's Patent No. 2,531,207, a shaft 616 is rocked counterclockwise to the position shown in Figure 15 to institute a program of division. Upon counterclockwise movement of shaft 616, a crank 616a fixed thereon will move a link 728 toward the rear of the machine. Link 728, at its forward end, has slot and pin connection with a crank 729 which is rotatably mounted on a shaft 591. Upon rearward movement of link 728, crank 729 will be rocked counterclockwise to the position shown in Figure 15. A pin 729a on crank 729 underlies the forward end of a rearwardly extending arm 730 which, at its rear, has pivotal mounting on a stud 519 which stud is connected to a link 518. Stud 519 is slidably mounted in a slot in the machine framing, and is driven forwardly by a device actuated by shaft 484 in a keyboard clearing operation which is automatically effected at the termination of both a division or multiplication program. This operation which is described in detail in the aforenoted Patent No. 2,531,207 is modified by the disclosure of application Serial No. 435,435.

At its forward end arm 730 has slot and pin connection with setting crank 708 for the keyboard locking means. Upon counterclockwise movement of crank 729, pin 729a will raise the forward end of arm 730 thereby rotating crank 708 clockwise to keyboard locking position as shown in Figure 10. Furthermore, when arm 730 is raised to this position a cam edge 730b at its forward end will be raised into engagement with a fixed pin 730a.

At the termination of the division program, shaft 616 will be rotated clockwise to normal so that crank 729 will be permitted clockwise rotation to normal. When the keyboard clearing operation attendant termination of the division program in instituted, stud 519 will be moved forwardly thereby moving arm 730 likewise and urging cam edge 730b against pin 730a. This operation will cam arm 730 counterclockwise thereby restoring crank 708 counterclockwise and unlocking the keyboard.

Figure 16:
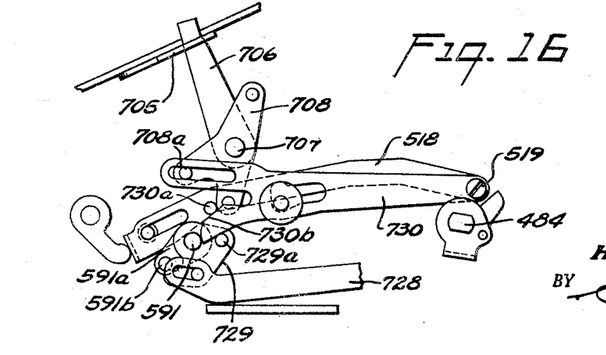
Fig. 16 is a view similar to Figure 15 showing the keyboard locking means set in response to initiation of a program of multiplication.

Shaft 591 is rocked counterclockwise from the position shown in Figure 15 to the position shown in Figure 16 to institute a program of multiplication as disclosed in the above noted Patent No. 2,531,207. Fast on shaft 591 is a crank 591a on which is mounted a pin 591b. Upon counterclockwise movement of shaft 591, pin 591b will engage and rock crank 729 counterclockwise to the position shown in Figure 16 which movement is permitted by the pin and slot connection with link 728. Arm 730 will therefore be adjusted to lock the keyboard as described in connection with Figure 15.

To terminate the program of multiplication shaft 591 is restored clockwise to the position shown in Figure 10. This will permit crank 729 also to be restored. The keyboard clearing operation will then operate arm 730 to unlock the keyboard as in the same manner as described in connection with the division program.

I claim:
1. In a calculating machine having cyclically driven registering mechanism; normally inactive adjustable devices operable to control operation of said registering mechanism, a driving element driven in timed relation with said registering mechanism for operating said adjusted control devices, a first key and a second key, means operable in response to manipulation of either of said keys to adjust said control devices to initiate a single cycle of said registering mechanism and position said devices in active position relative to said driving element; said element being effective upon completion of said single cycle to operate the adjusted control devices to initiate a second single cycle of said registering mechanism, and normally disabled resetting means adjustable to enabled position in response to manipulation of one of said keys for restoring said adjusted control devices to inactive position in response to the first cycle of operation of said registering mechanism.

2. The invention according to claim 1 wherein the cyclically driven registering mechanism is additively or subtractively operable, the first of said single cycles of said mechanism is additive, and the second is subtractive.

3. In a calculating machine having a register including an ordinal series of numeral wheels, cyclically driven additively or subtractively operable mechanism for registering selected values on said wheels, and an ordinal series of storage devices adjustable into driven relation with a respective series of said numeral wheels and normally disengaged therefrom; means for controlling entry of selected values into said register or alternatively into said storage devices comprising, normally inactive adjustable devices operable to control operation of said registering mechanism, a driving element driven in timed relation with said registering mechanism for operating said adjusted control devices, a first key and a second key, means operable in response to manipulation of either of said keys to adjust said control devices to initiate a single additive cycle of said registering mechanism and position said devices in active position relative to said driving element; said element being effective upon completion of said additive cycle to operate the adjusted control devices to initiate a single subtractive cycle of said registering mechanism, means operable by said control devices upon operation by said element to adjust said storage devices into driven relation with said numeral wheels during one of said cycles of said registering mechanism, and normally disabled resetting means adjustable to enabled position in response to manipulation of one of said keys for restoring said adjusted control devices to inactive position in response to the first cycle of operation of said registering mechanism.

4. In a calculating machine having a register including an ordinal series of numeral wheels, cyclically driven additively or subtractively operable mechanism for registering selected values on said wheels, and an ordinal series of storage devices adjustable into driven relation with a respective series of said numeral wheels and normally disengaged therefrom; means for controlling entry of selected values into said register or alternatively into said storage devices comprising, normally inactive adjustable devices operable to control adjustment of said storage devices and operation of said registering mechanism, a driving element driven in timed relation with said regisering mechanism for operating said adjusted control devices, a first key and a second key, means operable in response to manipulation of either of said keys to adjust said control devices to initiate a single additive cycle of said registering mechanism and position said control devices in active position relative to said driving element; said element being operable upon completion of said additive cycle to operate the adjusted control devices to adjust said storage devices into driven relation with said numeral wheels and to initiate a single subtractive cycle of said registering mechanism, and normally disabled resetting means adjustable to enabled position in response to manipulation of one of said keys for restoring said adjusted control devices to inactive position in response to the first cycle of operation of said registering mechansim.

5. In a calculating machine having cyclically driven registering mechanism; normally inactive adjustable devices operable to control operation of said registering mechanism, a driving element driven in timed relation with said registering mechanism for operating said adjusted control devices, a first key and a second key, means operable to response to manipulation of either of said keys to adjust said control devices to initiate a single cycle of said registering mechanism and position said devices to active position relative to said driving element; said element being effective upon completion of said single cycle to operate the adjusted control devices to initiate a second single cycle of said registering mechanism, a cam driven in timed relation with said registering mechanism, a normally broken and thereby disabled toggle operable by said cam to restore said adjusted control devices to inactive position, and means for setting and thereby enabling said toggle in response to manipulation of one of said keys.

6. In a calculating machine having an accumulator register and a counter register, cyclically driven additively or subtractively operable mechanism for registering selected values in said accumulator register, and a counter actuator; normally inactive adjustable devices operable to control operation of said registering mechanism, a driving element driven in timed relation with said registering mechanism for operating said adjusted control devices, a first key and a second key, means operable in response to manipulation of either of said keys to adjust said control devices to initiate a single additive cycle of said registering mechanism and position said devices in active position relative to said driving element; said element being effective upon completion of said additive cycle to operate the adjusted control devices to initiate a single subtractive cycle of said registering mechanism, normally disabled resetting means adjustable to enabled position in response to manipulation of one of said keys for restoring said adjusted control devices to inactive position in response to the first cycle of operation of said registering mechanism, and means operable in response to manipulation of said one key to disable said counter actuator during said additive cycle of said registering mechanism.

7. The invention according to claim 6 wherein the disabling means for the counter actuator has connection with the resetting means and is operated upon adjustment of said resetting means to enabled position.

8. The invention according to claim 6 wherein drive means for the counter actuator comprises a clutch and the disabling means for said counter actuator comprises a member operable to disengage said clutch.

9. In a motor driven calculating machine having a register, cyclically driven actuating means for said register including differentially settable actuators, and means for entering selected values into said differential actuators including depressible value keys; normally ineffectively positioned devices adjustable to a position effective to control cyclic operation of said actuating means, means for adjusting said control devices to effective position thereby initiating cyclic operation of said actuating means, means operable by said control devices for locking said value keys against depression upon adjustment of said control devices to effective position, and means driven by the motor in timed relation with said actuating means for restoring said control devices to ineffective position and for releasing said locking means.

10. In a motor driven calculating machine having a register, cyclically driven actuating means for said register including differentially settable actuators, and means for entering selected values into said differential actuators including depressible value keys; normally ineffectively positioned devices adjustable to a position effective to control cyclic operation of said actuating means, means for adjusting said control devices to effective position thereby initiating cyclic operation of said actuating means, means for locking said value keys against depression, a member operable by said control devices upon movement to effective position for moving said locking means to locking position, means driven by the motor in timed relation with said actuating means for restoring said control devices to ineffective position, and a member operable by said control devices upon movement to ineffective position for releasing said locking means.

11. The invention according to claim 10 wherein the member operable to release the locking means is adjustable, and means is provided to adjust said member from a normally disabled position to an enabled position upon cyclic operation of the register actuating mechanism.

12. In a motor driven calculating machine having a register, cyclically driven actuating means for said register including differentially settable actuators, and means for entering selected values into said differential actuators including depressible value keys; normally inactive adjustable devices operable to control operation of said actuating means, a driving element driven in timed relation with said actuating means for operating said adjusted control devices, a first key and a second key, means operable in response to manipulation of either of said keys to adjust said control devices to initiate a single cycle of said actuating means and position said devices in active position relative to said driving element; said element being effective upon completion of said single cycle to operate the adjusted control devices to initiate a second single cycle of said actuating means, means for locking said value keys against depression upon adjustment of said control devices to active position, normally disabled resetting means adjustable to enabled position in response to manipulation of one of said keys for restoring said adjusted control devices to inactive position in response to the first cycle of operation of said actuating means, and means for releasing said locking means upon movement of said control devices to inactive position.

13. In a calculating machine having cyclically driven registering mechanism; normally inactive adjustable devices operable to control operation of said registering mechanism, a first key and a second key, means operable in response to manipulation of either of said keys to adjust said control devices to initiate a single cycle of said registering mechanism, means operable upon completion of said single cycle to operate the adjusted control devices to initiate a second single cycle of said registering mechanism, and normally disabled resetting means adjustable to enabled position in response to manipulation of one of said keys for restoring said adjusted devices to inactive position in response to the first cycle of operation of said registering mechanism.

14. The invention according to claim 13 wherein the cyclically driven registering mechanism is additively or subtractively operable, one of said single or second single cycles of said mechanism is additive and the other is subtractive.

15. In a calculating machine having a register including an ordinal series of numeral wheels, cyclically driven registering mechanism for entering selected values into said wheels, and an ordinal series of storage devices adjustable into driven relation with a respective series of said wheels and normally disengaged therefrom; means for controlling entry of selected values into said register or alternatively into said storage devices comprising, normally inactive adjustable devices operable to control operation of said registering mechanism, a first key and a second key, means operable in response to manipulation of either of said keys to adjust said control devices to initiate a single cycle of said registering mechanism, means operable upon completion of said single cycle to operate the adjusted control devices to initiate a second single cycle of said registering mechanism, means operable by said control devices to adjust said storage devices into driven relation with said numeral wheels during one of said cycles of said registering mechanism, and normally disabled resetting means adjustable to enabled position in response to manipulation of one of said keys for restoring said adjusted control devices to inactive position in response to the first cycle of operation of said registering mechanism.

References Cited in the file of this patent

UNITED STATES PATENTS

| | | |
|---|---|---|
| 2,046,820 | Hilder | July 7, 1936 |
| 2,330,689 | Crosman | Sept. 28, 1943 |
| 2,361,002 | Anderson | Oct. 24, 1944 |
| 2,531,206 | Gang | Nov. 21, 1950 |
| 2,531,207 | Gang | Nov. 21, 1950 |
| 2,609,145 | Boyden | Sept. 2, 1952 |
| 2,644,637 | Butler | July 7, 1953 |
| 2,650,027 | Avery | Aug. 25, 1953 |
| 2,658,684 | Gang | Nov. 10, 1953 |
| 2,684,809 | Gang | July 27, 1954 |
| 2,726,037 | Landsiedel | Dec. 6, 1955 |
| 2,756,933 | Gang | July 31, 1956 |

UNITED STATES PATENT OFFICE
CERTIFICATE OF CORRECTION

Patent No. 2,931,568                                April 5, 1960

Herman Gang

It is hereby certified that error appears in the printed specification of the above numbered patent requiring correction and that the said Letters Patent should read as corrected below.

Column 1, line 23, for "calculation," read -- calculation. --; column 8, line 47, for "ot fhe" read -- of the --; column 9, line 18, for "wtih" read -- with --; column 12, line 18, for "chank" read -- crank --; column 15, lines 58 and 59, for "normaly" read -- normally --; line 65, for "regisering" read -- registering --; column 16, line 12, for "to", first occurrence, read -- in --.

Signed and sealed this 11th day of October 1960.

(SEAL)

Attest:

KARL H. AXLINE
Attesting Officer

ROBERT C. WATSON
Commissioner of Patents